United States Patent Office 2,739,980
Patented Mar. 27, 1956

2,739,980
SALTS OF OXYALKYLATED FATTY AMINES

Allan E. Chester, Highland Park, Ill., assignor to Poor & Company, Chicago, Ill., a corporation of Delaware No Drawing. Application December 19, 1951, Serial No. 262,470

4 Claims. (Cl. 260—501)

This invention relates to new and useful organic compounds and more particularly to reaction products of aldonic acids and oxyalkylated fatty amines and to a method for the preparation thereof.

One of the objects of the invention is to produce complex organic compounds which are soluble in acid solutions.

Another object of the invention is to produce new and useful reaction products of oxyalkylated fatty amines and aldonic acids.

A more specific object of the invention is the preparation of new and useful salts of oxyalkylated fatty amines and gluconic acid.

Another specific object of the invention is the preparation of new and useful acid stable water soluble oxyalkylated fatty amine gluconates.

A further object of the invention is the provision of a new and improved method for preparing compounds of the type referred to above. Other objects will appear hereinafter.

In accordance with the invention it has been found that new and useful products are obtained by reacting aldonic acids with oxyalkylated fatty amines. The preferred products are acid soluble and are especially suitable for use in acidic aqueous liquids, for example, acid pickling solutions. A copending application Serial No. 262,469, filed of even date herewith, describes acid pickling solutions containing products prepared in accordance with the present invention. It will be understood, however, that the products may be employed for many other purposes.

The invention will be further illustrated but is not limited by the following example in which the quantities are stated in parts by weight unless otherwise indicated.

Example

A product was prepared by mixing together:

| | Parts |
|---|---|
| A soybean amine oxyethylated with approximately 10 moles of ethylene oxide, containing 20 carbon atoms in its alkyl chain and having an average molecular weight of 714 | 86.5 |
| 50% gluconic acid | 13.5 |

The reaction between the amine and the aldonic acid to form the salt takes place at ordinary temperatures or may be effected by refluxing at elevated temperatures. The resultant product is a cationic wetting agent which is unusually stable in acid solutions, for example, 6 to 20% sulfuric acid solutions or 10 to 15% hydrochloric solutions.

The addition of ½ to 1 part of this product to 1000 gallons of a 6 to 20% sulfuric acid solution or a 10 to 15% hydrochloric solution increases the penetrating properties of such solutions in acid pickling, reduces the rusting tendency during the transfer of the pickled object from the pickling solution to a rinsing bath and assists in removing carbonaceous deposits.

Other reaction products of oxyalkylated fatty amines with aldonic acids may be prepared by substituting equivalent quantities of other amines for the oxyethylated soybean amine and by substituting other aldonic acids for the gluconic acid in the foregoing example.

The fatty amines are amines derived from fatty acids and normally contain 8 to 36 carbon atoms but may contain as high as 60 carbon atoms. They differ from each other in the number of carbon atoms in their alkyl groups, in the degree of saturation of the alkyl groups and in the number of alkyl groups attached to the amino nitrogen. Examples of fatty amines are those derived from soya beans, those derived from coconut oil and those derived from tallow. The oxyalkylation of these amines to produce oxyalkylated amines is effected by reacting the amines with an alkylene oxide, for example, ethylene oxide, 1,2-propylene oxide, or mixtures of ethylene oxide and 1,2-propylene oxide. The number of moles of the alkylene oxide is preferably at least 4 moles per mole of primary fatty amine, and for the purpose of the present invention the preferred products contain around 10 to 20 moles of alkylene oxide per mole of primary fatty amine. The fatty amines per se are water insoluble but oxyalkylation results in the addition of ether and hydroxy solubilizing groups to the molecule increasing the degree of water solubility and decreasing the cationic strength of the resultant material. The aldonic acid salts of the oxyalkylated fatty amines prepared in accordance with the present invention are more water soluble than the parent oxyalkylated fatty amines and are exceedingly acid stable.

When such salts are employed in acid pickling baths they will maintain a foam head on the bath even when the concentration of iron in the bath is as much as 14 to 16% Fe, whereas anionic wetting agents, such as sodium isopropyl naphthalene sulfonate are not effective at such concentrations.

Examples of other suitable aldonic acids which may be employed in preparing the products of the invention are mannonic, galactonic and arabonic acids. The aldonic acids are derived from aldoses by oxidation. All of the aldonic acids exist in various lactone forms and the invention contemplates the employment of any of these forms. Gluconic acid is preferred for the practice of the invention because it is more cheaply and readily available than the other aldonic acids.

In general it is preferable to employ approximately 1 mole of aldonic acid for each amine group present in the oxyalkylated fatty amine. In this connection it should be noted that the oxyalkylation of the fatty amine results in the formation of 2 oxyalkylene chains on the primary nitrogen atoms of the fatty amine thereby producing a tertiary amine. The products of the present invention are therefore reaction products of aldonic acids and tertiary oxyalkylated fatty amines.

The invention is hereby claimed as follows:

1. Salts of aldonic acids and oxyalkylated fatty amines containing in their molecules at least 4 oxyalkylene groups from the group consisting of oxyethylene and oxypropylene groups and in the aliphatic chain of the fatty amine 8 to 60 carbon atoms, said salts being soluble in water and in acid solutions and exhibiting cationic activity.

2. Salts of gluconic acids and oxyalkylated fatty amines containing in their molecules at least 4 oxyalkylene groups from the group consisting of oxyethylene and oxypropylene groups and in the aliphatic chain of the fatty amine 8 to 60 carbon atoms, said salts being soluble in water and in acid solutions and exhibiting cationic activity.

3. A gluconic acid salt of an oxyethylated tertiary fatty amine containing 10 to 20 oxyethylene groups per molecule and having in its alkyl group 8 to 36 carbon atoms, said salt being soluble in water and in aqueous acid solutions containing 6 to 20% sulfuric acid.

4. A gluconic acid salt of an oxyethylated soybean amine oxyethylated with approximately 10 moles of ethylene oxide and containing approximately 20 carbon atoms in its alkyl chain, said salt being soluble in water and in aqueous acid solutions containing 6 to 20% sulfuric acid.

References Cited in the file of this patent

UNITED STATES PATENTS

| | | |
|---|---|---|
| 2,174,762 | Schuette et al. | Oct. 3, 1939 |
| 2,355,337 | Spence | Aug. 8, 1944 |
| 2,485,564 | Chester et al. | Oct. 25, 1949 |
| 2,510,063 | Bried | June 6, 1950 |
| 2,541,678 | Swaney et al. | Dec. 13, 1951 |